United States Patent
Tangen

(10) Patent No.: US 6,713,570 B2
(45) Date of Patent: Mar. 30, 2004

(54) MOISTURE CURING HOT-MELT ADHESIVES

(75) Inventor: John C. Tangen, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 287 days.

(21) Appl. No.: 09/918,261

(22) Filed: Jul. 30, 2001

(65) Prior Publication Data

US 2003/0092831 A1 May 15, 2003

(51) Int. Cl.[7] .................. C08F 283/02; C08F 283/06; C08G 18/48; C08G 18/82
(52) U.S. Cl. .................. 525/458; 525/460; 528/76; 528/85
(58) Field of Search ................ 525/458, 460; 528/76, 85

(56) References Cited

U.S. PATENT DOCUMENTS

| | | | |
|---|---|---|---|
| 5,166,300 A | | 11/1992 | Rumon et al. |
| 5,418,310 A | * | 5/1995 | Kangas |
| 5,436,302 A | | 7/1995 | Stobbie, IV et al. |
| 5,472,785 A | | 12/1995 | Stobbie, IV et al. |
| 5,508,371 A | | 4/1996 | Werenicz et al. |
| 5,536,805 A | | 7/1996 | Kangas |
| 5,721,311 A | * | 2/1998 | Oien |
| 5,869,593 A | * | 2/1999 | Maitz-Franzo et al. |
| 5,916,964 A | | 6/1999 | Fromwiller |
| 6,221,978 B1 | | 4/2001 | Li et al. |
| 2003/0045636 A1 | * | 3/2003 | Krebs et al. |

FOREIGN PATENT DOCUMENTS

| | | | |
|---|---|---|---|
| DE | 199 61 941 A1 | | 7/2001 |
| DE | 199 61 941 | * | 7/2001 |

* cited by examiner

Primary Examiner—Tae H. Yoon
(74) Attorney, Agent, or Firm—Colene H. Blank

(57) ABSTRACT

The present invention is directed to a moisture curable, hot melt adhesive coating and/or sealant composition. The composition comprises (a) a first isocyanate-terminated prepolymer comprising the reaction product of an at least essentially semicrystalline hydroxy-functional material (Component A) and a polyisocyanate; (b) a second isocyanate-terminated prepolymer comprising the reaction product of an essentially semicrystalline poly(tetramethylene ether) glycol that has a molecular weight of at least about 1000 (Component B) and a polyisocyanate; and (c) a third isocyanate-terminated prepolymer comprising the reaction product of an essentially amorphous hydroxy-functional material (Component C) and a polyisocyanate, the essentially amorphous hydroxy-functional material having an average functionality less than 2.5 and a $Tg \leq -20°$ C. All essentially amorphous hydroxy-functional materials in the composition have a $Tg \leq -20°$ C.

21 Claims, No Drawings

MOISTURE CURING HOT-MELT ADHESIVES

FIELD OF THE INVENTION

This invention relates to mixtures of isocyanate-terminated polyurethanes having good adhesion properties.

BACKGROUND OF THE INVENTION

Isocyanate-terminated polyurethane prepolymers (sometimes referred to hereinafter as "polyurethane prepolymers" or "prepolymers") are desirable in a variety of applications. For example, they can be used in reactive hot melt urethane adhesive, coating and/or sealant systems. Hot melt urethane systems are solid at room temperature, melt to a viscous liquid when heated to moderate temperatures (e.g., 55° C.–121° C.), and are applied in a molten state to an appropriate substrate. They then cool to a solid state to provide an initial bond strength (sometimes referred to as "green strength"), and eventually achieve their ultimate bond strength in a curing reaction with ambient moisture.

An adhesive that can readily bond to polymeric substrates, for example, high impact polystyrene, is useful because such a substrate has previously not been amenable to adhesive bonding. Prior adhesives that have been amenable to bonding have generally required a high energy surface, such as polyvinyl chloride, polycarbonate or acrylonitrile-butadiene-styrene. Plastics with low surface energy, or even high surface energy plastics that are contaminated on the surface with oils, waxes or other release materials have tended to have poor adhesion. What is desired is an adhesive, such as a moisture curing hot-melt adhesive, which has good bonding to low surface energy plastics or plastics contaminated with release materials, for example waxes. Additionally, it is desired to achieve good adhesion to low surface energy plastics at low application temperatures (e.g., 55° C.–90° C.).

SUMMARY OF THE INVENTION

The present invention is directed to a moisture curable, hot melt adhesive coating and/or sealant composition. The composition comprises (a) a first isocyanate-terminated prepolymer comprising the reaction product of an at least essentially semicrystalline hydroxy-functional material (Component A) and a polyisocyanate; (b) a second isocyanate-terminated prepolymer comprising the reaction product of an essentially semicrystalline poly (tetramethylene ether) glycol that has a molecular weight of at least about 1000 (Component B) and a polyisocyanate; and (c) a third isocyanate-terminated prepolymer comprising the reaction product of an essentially amorphous hydroxy-functional material (Component C) and a polyisocyanate, the essentially amorphous hydroxy-functional material having an average functionality less than 2.5 and a $Tg \leq -20°$ C. All essentially amorphous hydroxy-functional materials in the composition have a $Tg \leq -20°$ C.

DETAILED DESCRIPTION

The present invention relates to a blend or mixture of isocyanate-terminated polyurethane prepolymers useful as an adhesive, coating and/or sealant and having good adhesion to low energy polymeric substrates.

In general, the blend comprises a first isocyanate-terminated polyurethane prepolymer, a second isocyanate-terminated polyurethane prepolymer, and a third isocyanate-terminated polyurethane prepolymer. Each polyurethane prepolymer comprises the reaction product of a hydroxy-functional material, such as a polyester polyol, and a polyisocyanate. "Functionality" is defined generally by the number of reactive groups (e.g., hydroxyl groups) per molecule of the hydroxy-functional material.

First Isocyanate-Terminated Polyurethane Prepolymer

The hydroxy-functional material (Component A) useful in making the first isocyanate-terminated polyurethane prepolymer of the invention is generally an essentially linear, saturated aliphatic material that is at least essentially semicrystalline. By "essentially semicrystalline" it is meant that Component A exhibits both a crystalline melting point (Tm) and a glass transition temperature (Tg), and has a crystallinity index of greater than 0.25. In some embodiments, the crystallinity index is greater than 0.30.

The crystallinity index of a polymer is defined as the fraction of crystalline material present in a sample of the polymer. A value of 1.0 represents 100% crystallinity and a value of zero corresponds to a completely amorphous material. X-ray diffraction data were collected using a Philips vertical diffractometer (available from Philips Analytical, Natick, Mass.), copper Kα ("$K_{alpha}$") radiation, and proportional detector registry of the scattered radiation. The diffractometer was fitted with variable entrance slits, diffracted beam graphite monochromator, and fixed exit slits. The X-ray generator had a sealed tube source, which used a copper target, and was operated at 45 kilovolts (kV) and 30 milliAmperes (mA). Data were collected in a reflection geometry from 5 to 55 degrees (corresponding to an angle of "2 theta") using a 0.04 degree step size and 8 second dwell time. Samples were prepared as thin smears on zero background specimen holders made of single crystal quartz. The program ORIGIN™ (Version 4.1, available from Microcal Software Incorporated, Northhampton, Mass.) was used to perform the profile fitting and measure peak area values. A Gaussian peak shape model and linear background model were employed to describe the individual crystalline peak and amorphous peak contributions. Crystallinity indices were calculated as the ratio of crystalline peak area to total (crystalline+amorphous) scattered peak area within the 6 to 36 degree (corresponding to an angle of "2 theta") scattering angle range.

Component A may have a Tm between about 5° C. and 120° C. (generally between about 40° C. and 105° C.) and a Tg below about 0° C. Essentially crystalline materials are included within the scope of "essentially semicrystalline" materials. If Component A is provided in the form of a polyester polyol, it may comprise the reaction product of a polyol, for example, a diol, and a polyacid, for example, a dicarboxylic acid.

Component A typically has a number average molecular weight (Mn) of at least about 2000, generally at least between about 2200 and about 10,000, and in specific embodiments between about 2500 and about 8500. At an Mn below about 2000, the resultant prepolymer is soft and may lack cohesive strength in the uncured state. At an Mn above about 10,000, the resultant prepolymer tends to be viscous which increases the difficulty of depositing acceptably thin lines of adhesive on a substrate.

A suitable diol useful in preparing the hydroxy-functional material Component A include, for example, those having from 2 to 12 methylene groups such as ethylene glycol, 1,4-butanediol, 1,5-pentanediol, 1,6-hexanediol, 1,8-octanediol, and 1,10-decanediol. Cycloaliphatic diols such as, for example, 1,4-cyclohexanediol and 1,4-cyclohexanedimethanol may also be employed.

A suitable dicarboxylic acid useful in preparing the hydroxy-functional material of Component A include, for example, those having from about 2 to 10 methylene groups such as succinic acid, glutaric acid, adipic acid, sebacic acid, azelaic acid, and 1,12-dodecanedioic acid. Included within the scope of useful acids are acid derivatives such as acid anhydrides, acid halides, and alkyl esters such as, for example, the methyl and ethyl esters.

Certain examples of a suitable Component A of the invention include, for example, polyhexamethylene sebacate, polyhexamethylene adipate, polybutylene adipate, polyhexamethylene dodecanedioate, poly-epsilon-caprolactone, and combinations thereof. In some embodiments, the essentially semicrystalline polyester polyol is polyhexamethylene sebacate or polyhexamethylene adipate. In specific embodiments, the essentially semicrystalline polyester polyol is 1,6-polyhexamethylene sebacate. 1,6-polyhexamethylene sebacate is the reaction product of 1,6-hexanediol and sebacic acid.

Examples of commercially available essentially semicrystalline polyester polyols useful in the invention include, for example, RUCOFLEX S-1074P-30 from Ruco Polymer Corporation, Hicksville, N.Y. and RUCOFLEX S-105P-30 from Ruco Polymer Corporation, Hicksville, N.Y.

Second Isocyanate-Terminated Polyurethane Prepolymer

A suitable second isocyanate-terminated polyurethane prepolymer may be an isocyanate-terminated prepolymer having an isocyanate index of about 1.2:1 to 10:1 and may comprise the reaction product of an essentially semicrystalline poly(tetramethylene ether) glycol (Component B) that has a molecular weight of at least about 1000 and a polyisocyanate. The number average molecular weight (Mn) of the poly(tetramethylene ether) glycol is generally at least about 1000. Examples of commercially available poly (tetramethylene ether) glycols useful in the invention include, for example, POLYMEG 2000 from Penn Specialty Chemicals, Inc., Memphis, Tenn.; the TERATHANE series from E. I. duPont de Nemours and Company, Wilmington, Del.; POLYTHF from BASF Corporation, Mount Olive, N.J. and combinations or mixtures thereof.

Third Isocyanate-Terminated Polyurethane Prepolymer

A suitable hydroxy-functional material used to prepare the third isocyanate-terminated prepolymer (Component C) is generally essentially amorphous. By "amorphous" it is meant that the hydroxy-functional material exhibits a Tg but lacks a Tm. An "essentially amorphous" material encompasses all amorphous materials and all materials that exhibit a crystallinity index of no greater than 0.25, and in some instances exhibit a crystallinity index of no greater than 0.20. An essentially amorphous material may exhibit a weak Tm. In certain embodiments, the Tg is lower than about −20° C. Materials with a Tg higher than −20° C. generally cause low adhesion to low surface energy substrates or undesirable zippy peel behavior, indicating areas with low or no bond. In certain embodiments, the hydroxy-functional material of the third prepolymer is provided in the form of a polyether polyol. The hydroxy-functional material has an average functionality of less than 2.5 in order to avoid gellation during polymerization. Generally, the hydroxy-functional material has an average functionality of between about 2 and about 2.1, inclusive. The essentially amorphous polyol should have an Mn of at least about 1000. Generally, the Mn is lower than 8500 to avoid the resultant prepolymer being highly viscous and difficult to blend and apply at working temperatures. In certain embodiments, the Mn is between about 2000 and about 5000. In a specific embodiment, the Mn is greater than 3000.

In some embodiments, the essentially amorphous Component C used to prepare the third isocyanate-terminated prepolymer is aliphatic. Polyols useful in preparing the essentially amorphous Component C include, for example, polyether polyols, such as diethylene glycol, dipropylene glycol. Other polyols include 1,3 propanediol, propylene glycol, butanediol, hexanediol, cyclohexanedimethanol and neopentyl glycol.

Polyacids with which the polyols may be reacted include, for example, linear aliphatic dicarboxylic acids such as succinic, adipic, and sebacic acids, aromatic dicarboxylic acids such as isophthalic, orthophthalic, and terephthalic. Included within the scope of useful acids are acid derivatives such as acid anhydrides and acid halides. If necessary, aromatic functionality may be introduced into the essentially amorphous hydroxy-functional material by reacting a diol with a blend of aliphatic and aromatic dicarboxylic acids.

Suitable essentially amorphous hydroxy-functional materials useful in the invention also include those reaction products of propylene oxide or butylene oxide capped or copolymerized with ethylene oxide. The polyether glycol may be the reaction product of propylene oxide copolymerized with ethylene oxide, for example, those compounds which are homopolymers or copolymers formed from one or more ingredients including ethylene oxide, propylene oxide, 1,2-butylene oxide, 1,4-butylene oxide and mixtures thereof. These materials may have a random or a block configuration. The number average molecular weight of the resultant polyether polyol is from about 1000 to about 8000 grams per mole and generally from about 2000 to about 4000 grams per mole.

In some instances it may be desirable to add a fourth isocyanate-terminated polyurethane prepolymer to the blends of the invention for example, to improve tack, cohesive strength, and/or compatibility of the mixture. The fourth isocyanate-terminated prepolymer may be formed from an essentially amorphous, essentially semicrystalline or essentially crystalline hydroxy-functional material (Component D). If the fourth isocyanate-terminated prepolymer is prepared by an essentially amorphous hydroxy-functional material, the essentially amorphous hydroxy-functional material must have a Tg below −20° C. to maintain good adhesion to low surface energy materials and avoid "zippy" peel behavior. If the fourth isocyanate-terminated prepolymer is prepared from an amorphous hydroxy-functional material having a Tg above −20° C., the peel may become "zippy" and there may be a loss of adhesion to low surface energy substrates.

It has been noted hereinabove that the semicrystalline and amorphous polyester polyols may be defined in part with reference to whether they display a Tg and/or a Tm. The presence and/or absence of a glass transition temperature and a crystalline melting point are techniques often used to characterize semicrystalline and amorphous (glassy) polymers. The two thermal transitions, Tg and Tm, can be quantitatively determined by measuring changes in specific volume and heat capacity through accepted analytical procedures such as differential scanning calorimetry (DSC). The midpoint of the endothermic transition was considered to be the Tg. Tm was considered to be the temperature at the apex of the endothermic peak. These techniques are described more fully in Thermal Characterization of Polymeric Materials, edited by Edith A. Turi (published 1981 by Academic Press, New York, N.Y.). Additionally, the degree of crystallinity may be determined as described above.

Polyisocyanates

Polyisocyanates which can be reacted with the hydroxy-functional materials (Component A, Component B and Component C) to form the prepolymers used in the instant invention may be aliphatic or aromatic. In certain embodiments, the polyisocyanates may be aromatic diisocyanates such as diphenylmethane-2,4'-diisocyanate and/or diphenylmethane 4,4'-diisocyanate (MDI); tolylene-2,4-diisocyanate and -2,6-diisocyanate (TDI) and mixtures thereof. Other examples include: naphthylene-1,5-diisocyanate; triphenylmethane-4,4',4"-triisocyanate; phenylene-1,3-diisocyanate and -1,4-diisocyanate; dimethyl-3,3'-biphenylene-4,4'-diisocyanate; diphenylisopropylidine-4,4'-diisocyanate; biphenylene diisocyanate; xylylene-1,3-diisocyanate and xylylene-1,4-diisocyanate.

A list of useful commercially available polyisocyanates is found in the Encyclopedia of Chemical Technology, Kirk-Othmer, 2nd Ed., vol. 12, pp. 46–47, Interscience Pub., N.Y. (1967), which is incorporated herein by reference. Some examples of isocyanates include diphenylmethane-4,4'-diisocyanate and its isomers and mixtures thereof.

Isocyanate-functional derivative(s) of MDI and TDI may be used, such as liquid mixtures of the isocyanate-functional derivative with melting point modifiers (e.g., mixtures of MDI with polycarbodiimide adducts such as ISONATE 143L, commercially available from Dow Chemical Company). Small amounts of polymeric diphenylmethane diisocyanate, generally 10% or less by weight of the total isocyanate components, (e.g., PAPI, and the series PAPI 20, commercially available from Dow Chemical Company, the MONDUR MR and MRS series of isocyanates commercially available from Mobay Chemical Corp., and RUBINATE M, commercially available from ICI Chemicals, Inc.) may be included. Blocked isocyanate compounds formed by reacting aromatic isocyanates or the above-described isocyanate-functional derivatives with blocking agents such as ketoximes and the like are also included within the invention.

Prepolymer Preparation

The prepolymers useful herein may be prepared by techniques that are well known in the art. For example, prepolymers suitable in the invention may be formed by reacting a mixture of Component A, Component B, Component C and the polyisocyanate(s) in a suitable vessel. Alternatively, the prepolymers may be prepared by reacting each of Component A, Component B, and Component C polymers separately with the polyisocyanate(s) and blending the resultant prepolymers. Still further, the prepolymers may be prepared by forming one prepolymer and subsequently forming the other prepolymer or prepolymers in the first.

Typically, the components are mixed at an elevated temperature using conventional mixing techniques. In some embodiments, the components are mixed under anhydrous conditions. Generally, the prepolymers are prepared without the use of solvents although solvents may be employed if desired.

The isocyanate should be present in the reaction mixture in an amount greater than the hydroxy-functional materials. The equivalent ratio of isocyanate-to-hydroxyl (sometimes referred to hereinafter as the isocyanate index) is generally from about 1.2/1 to about 10/1 and in specific embodiments, the isocyanate index may be from about 1.5/1 to 2.2/1.

The blends of the invention generally may comprise from about 30 to about 60 parts by weight of Component A, from about 10 to about 40 parts by weight of Component B, and from about 15 to about 50 parts by weight of Component C. In specific embodiments, the three component blend comprises from about 30 to about 50 parts by weight of Component A, from about 20 to about 35 parts by weight of Component B, and from about 20 to about 50 parts by weight of Component C.

The compositions of the invention may further include isocyanate-terminated polyurethane prepolymers other than the prepolymers described above. The additional prepolymers may be added to the prepolymer blends of the invention for a variety of purposes such as to further adjust the open time, green strength build-up, tack, final strength, compatibility, adhesion etc. of the resultant mixture.

Similarly, other monomeric materials may also be included in the polymerization mixture so as to incorporate them directly into either the hydroxy-functional materials of the prepolymers or the prepolymers themselves. Examples of such other monomeric materials which may be used to modify the polyester polyols include neopentyl glycol, ethylene glycol, butanediol, hexanediol, succinic acid, sebacic acid, terephthalic acid, orthophthalic acid, etc. An example of a monomer used to modify the poly(tetramethylene ether) glycol is ethylene oxide. The exact level of "other monomer" utilized is not critical to the invention provided it does not materially negatively affect the adhesion of the composition. Typically, the other monomers may comprise up to 50 mole percent of the polymerization mixture.

Other ingredients or adjuvants may be employed with the blends of the invention to impart to or modify particular characteristics of the composition. These ingredients are included in the overall blends or mixtures of the invention rather than being incorporated into the constituent components thereof. The adjuvants should be added only at a level that does not materially adversely interfere with the adhesion of the composition. The adjuvants may comprise up to 50 weight percent of the composition either individually or in combination. For example, chain-extension agents (e.g., short chain polyols such as ethylene glycol or butanediol); fillers (e.g., carbon black; glass, ceramic, metal or plastic bubbles; metal oxides such as zinc oxide; and minerals such as talc, clays, silica, silicates, and the like), thermoplastic resins; plasticizers; antioxidants; pigments; U.V. absorbers; and adhesion promoters such as silanes, and the like may be included to modify set time, open time, green strength build-up, tack, flexibility, adhesion etc.

In addition, the compositions of the invention may include an effective amount of a catalyst or reaction accelerator such as tertiary amines, metal-organic compounds, co-curatives, and the like. An effective amount of a catalyst is, for example, from about 0.005 to 2 percent by weight of the total prepolymer weight. In specific embodiments, the catalyst is present at a level of about 0.01 to about 0.5 percent, based on the total weight of the prepolymers employed.

The following examples are offered to aid understanding of the present invention and are not to be construed as limiting the scope thereof. All parts are by weight unless otherwise stated.

Test Methods

Viscosity of Isocyanate-Terminated Polyurethane Prepolymer Compositions

Viscosity of the isocyanate-terminated polyurethane prepolymer compositions was determined at 250° F. (121° C.) using a heated Brookfield viscometer (spindle 27) (Thermosell; available from Brookfield Engineering Laboratories, Stoughton, Mass.). The results are reported in centipoise.

Glass Transition Temperature of Component C

Glass transition temperatures (Tg) of Component C were measured using Differential Scanning Calorimetry (DSC). The Tg is defined as the inflection midpoint of the endothermic transition. The temperature range scanned varied depending on the Tg, but was run from at least 30° C. below the Tg to at least 90° C. above it. A scan rate of 10° C./minute was employed for all samples except Priplast 3192 and S-108-46, which were run at 20° C./minute.

Peel Adhesion Strength

Peel adhesion was determined using a modified version of ASTM D-903 in which the flexible substrate was canvas (cotton duck) and the rigid substrate was high impact modified polystyrene (HIPS) (FINA 825, available from ATOFINA Petrochemicals Incorporated, Houston, Tex.). The adhesive was dispensed at 250° F. (121° C.) onto the center portion of 1 inch (2.5 centimeters) wide by 4 inches (10.2 centimeters) long by 0.125 inches (0.3 centimeters) thick piece of cheesecloth-wiped HIPS substrate. Immediately, a 1.5 inch wide (3.8 centimeters) by 8 inch (20.3 centimeters) long piece of canvas was bonded to the adhesive-coated surface of the HIPS substrate using a press at 100 pounds/inch$^2$ (psi) (0.7 MPa) for about 15 seconds. This was sufficient pressure to force the adhesive to cover the entire bond area and squeeze the excess adhesive from the edges of the bond area. The test coupon obtained was conditioned at 77° F. (25° C.) and 50% Relative Humidity for between 3 and 7 days. The canvas was then trimmed to a 1 inch (2.5 centimeters) width and the resulting coupon was tested for peel adhesion at a peel angle of 180° and a crosshead speed of 2 inches/minute (5.1 centimeters/minute) using a SINTECH 10 Tensile Tester (available from MTS Systems Corporation, Eden Prairie, Minn.). Six test coupons were evaluated and the results used to report the "highest high" value (hereinafter referred to as the high value), the "lowest low" value (hereinafter referred to as the low value), and the "average of the average values" (hereinafter referred to as the average value) for adhesion strength. The results are reported in pounds per inch width (piw) (kN/m). Certain embodiments of the invention exhibit an "Average" peel adhesion strength of at least 20 piw (3.5 kN/m). In specific desired embodiments, they exhibit a "Low" peel adhesion strength of at least 20 piw (3.5 kN/m).

After peel testing, the coupons were inspected for "zippy" peel behavior. Such behavior was indicated by the presence of regions on the substrate surface that were not wetted out by the adhesive. This usually manifested itself during peel testing by a sudden drop in peel strength followed by an abrupt increase in peel strength. Such behavior has also been termed "slip-stick" behavior. Examples that showed signs of zippy peel behavior were rated "Fail". The compositions of the invention do not exhibit this behavior and were rated "Pass".

Crystallinity Index

The crystallinity index of a polymer is defined as the fraction of crystalline material present in a sample of the polymer. A value of 1.0 represents 100% crystallinity and a value of zero corresponds to a completely amorphous material. X-ray diffraction data were collected using a Philips vertical diffractometer (available from Philips Analytical, Natick, Mass.), copper $K_\alpha$ ("K alpha") radiation, and proportional detector registry of the scattered radiation. The diffractometer was fitted with variable entrance slits, diffracted beam graphite monochromator, and fixed exit slits. The X-ray generator had a sealed tube source, which used a copper target, and was operated at 45 kilovolts (kV) and 30 milliAmperes (mA). Data were collected in a reflection geometry from 5 to 55 degrees (corresponding to an angle of "2 theta") using a 0.04 degree step size and 8 second dwell time. Samples were prepared as thin smears on zero background specimen holders made of single crystal quartz. The program ORIGIN™ (Version 4.1, available from Microcal Software Incorporated, Northhampton, Mass.) was used to perform the profile fitting and measure peak area values. A Gaussian peak shape model and linear background model were employed to describe the individual crystalline peak and amorphous peak contributions. Crystallinity indices were calculated as the ratio of crystalline peak area to total (crystalline +amorphous) scattered peak area within the 6 to 36 degree (corresponding to an angle of "2 theta") scattering angle range.

General Preparation of Isocyanate-Terminated Polyurethane Prepolymers

The hydroxy-functional materials (Component A, Component B, and Component C were combined in a 1 pint (0.47 liter) paint can container which was then placed in a 250° F. (121° C.) oven to melt the materials therein. Once melted, the mixture was stirred with a wooden tongue depressor to ensure thorough blending. The container was then put into a vacuum oven at 250° F. (121° C.) for 3 hours to dry the blend. Next, the container with the dried blend was placed on a hot plate (Model 700-5011, available from Barnant Company, Barrington, Ill.), set on "Low" to give a surface temperature between about 200 and 230° F. (93 and 110° C.) and stirred using an air motor equipped with a stainless steel propeller blade. UNILIN 550 (a mono-hydroxy functional polyethylene wax having a number average molecular weight of 550, available from Baker Petrolite, Polymers Division, Sugar Land, Tex.) was then added in a single charge with stirring. Once the wax was melted and well dispersed, 4,4'-diphenylmethane diisocyanate (MDI), in flaked form, was added and mixed in a similar manner. Finally, 2,2'-dimorpholinodiethylether (FASTCAT DMDEE, an endcapping and cure promoting catalyst, available from Huntsman Chemical Corporation, Houston, Tex.) was added with stirring. The amounts of wax and catalyst were 0.1% and 0.2% by weight respectively, based on the combined weight of the three hydroxy-functional materials, MDI, wax, and DMDEE used. The mixture was stirred for about 30 seconds, and then placed in a vacuum oven at 250° F. (121° C.) for between 2 and 3 minutes. The degassed mixture was poured into a 0.1 gallon (0.38 liter) aluminum cartridge and sealed. The filled cartridge was aged at 160° F. (71° C.) for 24 hours to ensure complete reaction of the hydroxy-functional materials with MDI to form a mixture of isocyanate-terminated polyurethane prepolymers.

EXAMPLES

Examples 1–3

Examples 1–3 were prepared using the materials and amounts (in parts by weight, pbw) shown in Table 1 below, as described in "General Preparation of Isocyanate-terminated Polyurethane Prepolymers" above (including the use of the wax and catalyst). Component A refers to the crystalline, hydroxy-functional material poly (hexamethylene sebacate), herein designated as PHSe (available as RUCOFLEX S-1074-30, having a hydroxyl number between 27 and 33 and a crystallinity index of 0.58, from Ruco Polymer Corporation, Hicksville, N.Y.), Component B, herein designated as PTHF, refers to poly (tetramethylene ether) glycol (available as POLYMEG 2000, having a molecular weight of between about 1900 and 2100 and a hydroxyl number of between 53 and 59, from Penn Specialty Chemicals, Memphis, Tenn.), and Component C refers to the amorphous dihydroxy-functional material. For Component C the following materials were used:

PPG 1000 (a polyether-based diol having a molecular weight of about 1000 and a hydroxy number of about 111, available from Lyondell Chemical Company, Newtown Square, Pa.); and ACCLAIM 4200 (a polyether-based diol having a molecular weight of about 4000 and a hydroxyl number between 26.5 and 29.5, available from Lyondell Chemical Company, Newtown Square, Pa.). The prepolymer compositions were evaluated for viscosity, peel adhesion strength and zippy peel behavior as described in the test methods above. The results are shown in Table 2 below.

TABLE 1

|  | Example 1 | Example 2 | Example 3 |
|---|---|---|---|
| Component A | PHSe | PHSe | PHSe |
| pbw | 30 | 40 | 50 |
| Component B | PTHF | PTHF | PTHF |
| pbw | 20 | 30 | 30 |
| Component C | ACCLAIM 4200 | PPG 1000 | ACCLAIM 4200 |
| Tg (° C.) | −68 | −70 | −68 |
| pbw | 50 | 30 | 20 |
| MDI pbw | 11.2 | 21.0 | 13.8 |
| NCO:OH Ratio (equivalents ratio) | 1.50:1.0 | 1.60:1.0 | 1.70:1.0 |
| Viscosity of Polyurethane Prepolymer at 121° C. (cps) | 5175 | 3175 | 8625 |

TABLE 2

|  | Example 1 | Example 2 | Example 3 |
|---|---|---|---|
| Peel Strength High/Average/Low (piw) (kN/m) | 63/49/35 (11.3/8.8/6.3) | 59/43/34 (10.6/7.7/6.2) | 69/61/53 (12.4/11.0/9.5) |
| Zippy Peel Behavior (Pass/Fail) | Pass | Pass | Pass |

Examples 1–3 show that Component A may be useful from 30 to 50 pbw; and that 5 Component C may be useful from 20 to 50 pbw. Further, the Tg of Component C is less than −20° C.

Examples 4–10

Examples 4–10 were prepared using the materials and amounts (in parts by weight, pbw) shown in Tables 3 and 4 below, as described in "General Preparation of Isocyanate-terminated Polyurethane Prepolymers" above (including the use of the wax and catalyst). Component A refers to the crystalline, hydroxy-functional material poly (hexamethylene adipate), herein designated as PHA (available as RUCOFLEX S-105P-30, having a molecular weight of about 3620 and a hydroxyl number between about 27 and about 33, and having a crystallinity index of 0.51, from Ruco Polymer Corporation, Hicksville, N.Y.). Component B is the same as defined in Examples 1–3. For Component C the following materials were used: PRIPLAST 3192 (a dimer acid-based polyester polyol having a crystallinity index of 0.17 with a Tm of 45° C. and a Tg of about −58° C., a molecular weight of about 2000, and a hydroxy number of between 52 and 60, available from Uniqema, Wilmington, Del.); PPG 1000; ACCLAIM 4220 (an ether copolymer-based diol having a molecular weight of about 4000 and a hydroxyl number between 26.5 and 29.5, available from Lyondell Chemical Company, Newtown Square, Pa.); DEG Adipate (a polyester-polyether-based polyol having a hydroxyl number of between about 48 and about 52, and a molecular weight between about 2150 and about 2350 and a functionality of about 2.05, obtained from Reichhold, Research Triangle Park, N.C. as Polylite 34149-50); DPG Adipate (a polyester-polyether-based polyol having a molecular weight of 2183 and a hydroxyl number of 51.5, obtained from Reichhold, Research Triangle Park, N.C.); and S-108-46 (a polyester-based polyol having a molecular weight of about 2500 and a hydroxyl number of about 51, available from Ruco Polymer Corporation, Hicksville, N.Y.). The prepolymer compositions were evaluated for viscosity, peel adhesion strength and zippy peel behavior as described in the test methods above. The results are shown in Tables 5 and 6 below.

TABLE 3

|  | Example 4 | Example 5 | Example 6 | Example 7 |
|---|---|---|---|---|
| Component A | PHA | PHA | PHA | PHA |
| pbw | 30 | 40 | 40 | 40 |
| Component B | PTHF | PTHF | PTHF | PTHF |
| pbw | 30 | 30 | 30 | 30 |
| Component C | PRIPLAST 3192 | PPG 1000 | ACCLAIM 4220 | DEG Adipate |
| Tg (° C.) | −64 | −70 | −68 | −50 |
| pbw | 40 | 30 | 30 | 30 |
| MDI pbw | 16.3 | 19.9 | 13.8 | 15.7 |
| NCO:OH Ratio (equivalents ratio) | 1.60:1.0 | 1.50:1.0 | 1.70:1.0 | 1.65:1.0 |
| Viscosity of Polyurethane Prepolymer at 121° C. (cps) | 5625 | 4075 | 4625 | 14,300 |

TABLE 4

|  | Example 8 | Example 9 | Example 10 |
|---|---|---|---|
| Component A | PHA | PHA | PHA |
| pbw | 40 | 45 | 40 |
| Component B | PTHF | PTHF | PTHF |
| pbw | 30 | 35 | 30 |
| Component C | DPG Adipate | DPG Adipate | S-108-46 |
| Tg (° C.) | −46 | −46 | −45 |
| pbw | 30 | 20 | 30 |
| MDI pbw | 15.8 | 15.2 | 15.3 |
| NCO:OH Ratio (equivalents ratio) | 1.65:1.0 | 1.65:1.0 | 1.65:1.0 |
| Viscosity of Polyurethane Prepolymer at 121° C. (cps) | 3900 | 7875 | 8300 |

TABLE 5

|  | Example 4 | Example 5 | Example 6 | Example 7 |
|---|---|---|---|---|
| Peel Strength High/Average/Low (piw) (kN/m) | 55/45/18 (9.9/8.1/3.2) | 41/34/24 (7.4/6.1/4.3) | 61/54/42 (11.0/9.7/7.6) | 44/37/27 (7.9/6.7/4.9) |
| Zippy Peel Behavior (Pass/Fail) | Pass | Pass | Pass | Pass |

TABLE 6

| | Example 8 | Example 9 | Example 10 |
|---|---|---|---|
| Peel Strength High/Average/Low (piw) (kN/m) | 44/32/20 (7.9/5.8/3.6) | 56/41/32 (10.1/7.4/5.8) | 78/55/38 (14.0/9.9/6.8) |
| Zippy (Pass/Fail) | Pass | Pass | Pass |

Examples 4–10 demonstrate that a variety of amorphous hydroxy-functional materials having a Tg of less than −20° C. may be used as Component C, and that PHA may be employed as the crystalline, hydroxy-functional material.

Comparative Examples 1–5

Comparative Examples 1–5 were prepared using the materials and amounts (in parts by weight, pbw) shown in Table 7 below, as described in "General Preparation of Isocyanate-terminated Polyurethane Prepolymers" above (including the use of the wax and catalyst). Components A, B, and C are as defined previously. Where employed, Component C was one of the following materials: DYNACOLL RP 7111 (a co-polyester-based polyol having a molecular weight of 3500 and a hydroxyl number of between 27 and 34, available from Creanova Incorporated, Somerset, N.J.), or STEPAN PN 110 (a polyester polyol having a molecular weight of about 935 to about 1120 and a hydroxyl number of between about 100 to about 120, available from Stepan Company, Northfield, Ill.). The prepolymer compositions were evaluated for viscosity, peel adhesion strength and zippy peel behavior as described in the test methods above. The results are shown in Table 8 below.

Comparative Examples 1–4 demonstrate that the presence of Component C, having a Tg less than −20° C., is required in order to provide a combination of the desired peel adhesion strength without the presence of zippy peel behavior.

Comparative Example 6

Comparative Example 6 was prepared using the materials and amounts (in parts by weight, pbw) shown in Table 9 below, as described in "General Preparation of Isocyanate-terminated Polyurethane Prepolymers" above (including the use of the wax and catalyst). Components A, B. and C are as defined previously. The prepolymer composition was evaluated for viscosity, peel adhesion strength and zippy peel behavior as described in the test methods above. The results are shown in Table 10 below.

TABLE 9

| | Comparative Example 6 |
|---|---|
| Component A | PHA |
| pbw | 60 |
| Component B | PTHF |
| pbw | 15 |
| Component C | DEG |
| Tg (° C.) | −40 |
| pbw | 10 |
| Component D | RP 7111 |
| Tg (° C.) | +11 |
| pbw | 15 |
| MDI | 14.4 |
| pbw | |
| NCO:OH Ratio (equivalents ratio) | 1.78:1.0 |

TABLE 7

| | Comparative Example 1 | Comparative Example 2 | Comparative Example 3 | Comparative Example 4 | Comparative Example 5 |
|---|---|---|---|---|---|
| Component A | PHA | PHA | PHA-30 | PHA | PHSe |
| pbw | 30 | 45 | 30 | 50 | 50 |
| Component B | PTHF | PTHF | PTHF | PTHF | PTHF |
| pbw | 30 | 35 | 30 | 50 | 50 |
| Component C | RP 7111 | RP 7111 | PN 110 | None | None |
| Tg (° C.) | +11 | +11 | +26 | | |
| pbw | 40 | 20 | 40 | | |
| MDI pbw | 16.5 | 14.7 | 24.2 | 15.8 | 15.7 |
| NCO:OH Ratio (equivalents ratio) | 1.65:1.0 | 1.65:1.0 | 1.65:1.0 | 1.70:1.0 | 1.70:1.0 |
| Viscosity of Polyurethane Prepolymer at 121° C. (cps) | 6100 | 9925 | 5600 | 7750 | 5925 |

TABLE 8

| | Comparative Example 1 | Comparative Example 2 | Comparative Example 3 | Comparative Example 4 | Comparative Example 5 |
|---|---|---|---|---|---|
| Peel Strength High/Average/Low (piw) (kN/m) | 5/4/3 (0.9/0.7/0.5) | 69/43/0 (12.4/7.7/0) | 5/4/3 (0.9/0.7/0.5) | 52/16/6 (9.4/2.9/1.1) | 69/41/2 (12.4/7.4/0.4) |
| Zippy Peel Behavior (Pass/Fail) | Pass | Fail | Pass | Fail | Fail |

TABLE 9-continued

|  | Comparative Example 6 |
|---|---|
| Viscosity of Polyurethane Prepolymer at 121° C. (cps) | 9000 |

TABLE 10

|  | Comparative Example 6 |
|---|---|
| Peel Strength High/Average/Low (piw) (kN/m) | 21/9/4 3.8/1.6/0.7 |
| Zippy Peel Behavior (Pass/Fail) | Fail |

Comparative Example 6 demonstrates that the addition of a fourth isocyanate-terminated prepolymer with a Tg higher than −20° C. causes zippy peel behavior.

Various modifications and alterations of the present invention will become apparent to those skilled in the art without departing from the spirit and scope of the invention.

What is claimed is:

1. A moisture curable, hot melt adhesive coating and/or sealant composition comprising:
   (a) a first isocyanate-terminated prepolymer comprising the reaction product of an at least essentially semicrystalline hydroxy-functional material and a polyisocyanate;
   (b) a second isocyanate-terminated prepolymer comprising the reaction product of an essentially semicrystalline poly(tetramethylene ether) glycol that has a molecular weight of at least about 1000 and a polyisocyanate; and
   (c) a third isocyanate-terminated prepolymer comprising the reaction product of an essentially amorphous hydroxy-functional material and a polyisocyanate, the essentially amorphous hydroxy-functional material having an average functionality less than 2.5 and a Tg≦−20° C.;
   wherein all essentially amorphous hydroxy-functional materials in the composition have a Tg≦−20° C.

2. The moisture curable, hot melt adhesive, coating and/or sealant composition according to claim 1 wherein the at least essentially semicrystalline hydroxy-functional material has an essentially linear, saturated, aliphatic structure.

3. The moisture curable, hot melt adhesive, coating and/or sealant composition according to claim 2 wherein the at least essentially semicrystalline hydroxy-functional material has a crystalline melting point between about 5° C. and 120° C. and a glass transition temperature less than about 0° C.

4. The moisture curable, hot melt adhesive, coating and/or sealant composition according to claim 3 wherein the at least essentially semicrystalline hydroxy-functional material has a crystalline melting point between about 40° C. and 105° C.

5. The moisture curable, hot melt adhesive, coating and/or sealant composition according to claim 1 wherein the at least essentially semicrystalline hydroxy-functional material comprises the reaction product of a diol having from about 2 to 10 methylene groups and a dicarboxylic acid having from about 2 to 10 methylene groups.

6. The moisture curable, hot melt adhesive, coating and/or sealant composition according to claim 5 wherein the diol is selected from the group consisting of ethylene glycol, 1,4-butanediol, 1,5-pentanediol, 1,6-hexanediol, 1,8-octanediol, 1,10-decanediol, 1,4-cyclohexanediol, 1,4-cyclohexanedimethanol, and mixtures thereof.

7. The moisture curable, hot melt adhesive coating and/or sealant composition according to claim 5 wherein the dicarboxylic acid is selected from the group consisting of succinic acid, glutaric acid, adipic acid, sebacic acid, azelaic acid, 1,12-dodecanedioic acid, derivatives thereof, and mixtures thereof.

8. The moisture curable, hot melt adhesive, coating and/or sealant composition according to claim 5, wherein the at least essentially semicrystalline hydroxy-functional material is either polyhexamethylene adipate or polyhexamethylene sebacate or combinations of each.

9. The moisture curable, hot melt adhesive, coating and/or sealant composition according to claim 1 wherein the essentially amorphous hydroxy-functional material has a crystallinity index of less than 0.20.

10. The moisture curable, hot melt adhesive, coating and/or sealant composition according to claim 1 wherein the essentially amorphous hydroxy-functional material is the reaction product of a polyol and a polyacid.

11. The moisture curable, hot melt adhesive, coating and/or sealant composition according to claim 10 wherein the polyol is a polyether polyol, a 1,3 propanediol, a propylene glycol, a butanediol, a hexanediol, a cyclohexanedimethanol a neopentyl glycol or combinations thereof.

12. The moisture curable, hot melt adhesive, coating and/or sealant composition according to claim 11 wherein the polyether polyol is a diethylene glycol, a dipropylene glycol, or combinations thereof.

13. The moisture curable, hot melt adhesive, coating and/or sealant composition according to claim 10 wherein the polyacid is a linear aliphatic dicarboxylic acid, an aromatic dicarboxylic acids, or combinations thereof.

14. The moisture curable, hot melt adhesive, coating and/or sealant composition according to claim 13 wherein the linear aliphatic dicarboxylic acid is a succinic acid, an adipic acid, a sebacic acid, or combinations thereof.

15. The moisture curable, hot melt adhesive, coating and/or sealant composition according to claim 13 wherein the aromatic dicarboxylic acids is an isophthalic acid, an orthophthalic acid, a terephthalic acid, or combinations thereof.

16. The moisture curable, hot melt adhesive, coating and/or sealant composition according to claim 1 wherein the essentially amorphous hydroxy-functional material is the reaction product of propylene oxide or butylene oxide capped or copolymerized with ethylene oxide.

17. The moisture curable, hot melt adhesive, coating and/or sealant composition according to claim 1 wherein the essentially amorphous hydroxy-functional material has an average functionality of between about 2.0 and about 2.1 inclusive.

18. The moisture curable, hot melt adhesive, coating and/or sealant composition according to claim 1, the blend comprising from about 30 to about 60 parts by weight of the first prepolymer, from about 10 to about 40 parts by weight of the second prepolymer, and from about 15 to about 50 parts by weight of the third prepolymer.

19. The moisture curable, hot melt adhesive, coating and/or sealant composition according to claim 1, the blend comprising from about 30 to about 50 parts by weight of the first prepolymer, from about 20 to about 35 parts by weight of the second prepolymer, and from about 20 to about 50 parts by weight of the third prepolymer.

20. An article, the article comprising a substrate having a layer of a moisture curable, hot melt adhesive, coating and/or sealant composition according to claim 1 thereon.

21. A moisture curable, hot melt adhesive coating and/or sealant composition comprising:
(a) a first isocyanate-terminated prepolymer comprising the reaction product of an at least essentially semicrystalline hydroxy-functional material and a polyisocyanate;
(b) a second isocyanate-terminated prepolymer comprising the reaction product of a poly(tetramethylene ether) glycol that has a molecular weight of at least about 1000 and a polyisocyanate; and
(c) a third isocyanate-terminated prepolymer comprising the reaction product of an essentially amorphous hydroxy-functional material and a polyisocyanate, the essentially amorphous hydroxy-functional material having a number average molecular weight greater than 3000 and a $Tg \leq -20°$ C.;

wherein all essentially amorphous hydroxy-functional materials in the composition have a $Tg \leq -20°$ C.

* * * * *

UNITED STATES PATENT AND TRADEMARK OFFICE
CERTIFICATE OF CORRECTION

| | | |
|---|---|---|
| PATENT NO. | : 6,713,570 B2 | Page 1 of 1 |
| APPLICATION NO. | : 09/918261 | |
| DATED | : March 30, 2004 | |
| INVENTOR(S) | : John C. Tangen | |

It is certified that error appears in the above-identified patent and that said Letters Patent is hereby corrected as shown below:

Column 9,
Line 39, after "that" delete "5".

Column 12,
Line 12, delete "B." and insert -- B, --, therefor.

Signed and Sealed this

Eleventh Day of September, 2007

JON W. DUDAS
*Director of the United States Patent and Trademark Office*